United States Patent [19]

Handa

[11] 4,429,481
[45] Feb. 7, 1984

[54] SPIN-CASTING ROD WITH LURE JERKING ASSEMBLY

[76] Inventor: David H. Handa, 4 N. 525 Route 83, Bensenville, Ill. 60106

[21] Appl. No.: 312,006

[22] Filed: Oct. 16, 1981

[51] Int. Cl.³ ..................... A01K 87/00; A01K 97/00
[52] U.S. Cl. ......................................... 43/19.2; 43/25
[58] Field of Search ....................... 43/19.2, 25, 15, 16

[56] References Cited

U.S. PATENT DOCUMENTS

| | | | |
|---|---|---|---|
| 2,658,299 | 11/1953 | Maxfield | 43/25 X |
| 2,783,576 | 5/1957 | Filut | 43/19.2 |
| 2,799,112 | 7/1957 | Wilson | 43/19.2 |
| 3,053,004 | 9/1962 | Baker | 43/25 |
| 3,889,413 | 6/1975 | Snider et al. | 43/15 |

Primary Examiner—Nicholas P. Godici
Assistant Examiner—Charles L. Willis
Attorney, Agent, or Firm—Dillis V. Allen

[57] ABSTRACT

A spin-casting rod and reel assembly that has a rod with a top guide pivotally mounted between the rod butt guide and the handgrip on the main rod to impart intermittent motion or "jerking" to the line and lure during line pay-in. The jerk-rod is spring biased to an inactive position parallel to and closely adjacent to the main rod with its top guide adjacent the main rod's butt guide, and is moveable to an active position by the fisherman's manual hand manipulation with the jerk-rod top guide spaced considerably from the butt guide to accelerate line and lure pay-in intermittently.

12 Claims, 6 Drawing Figures

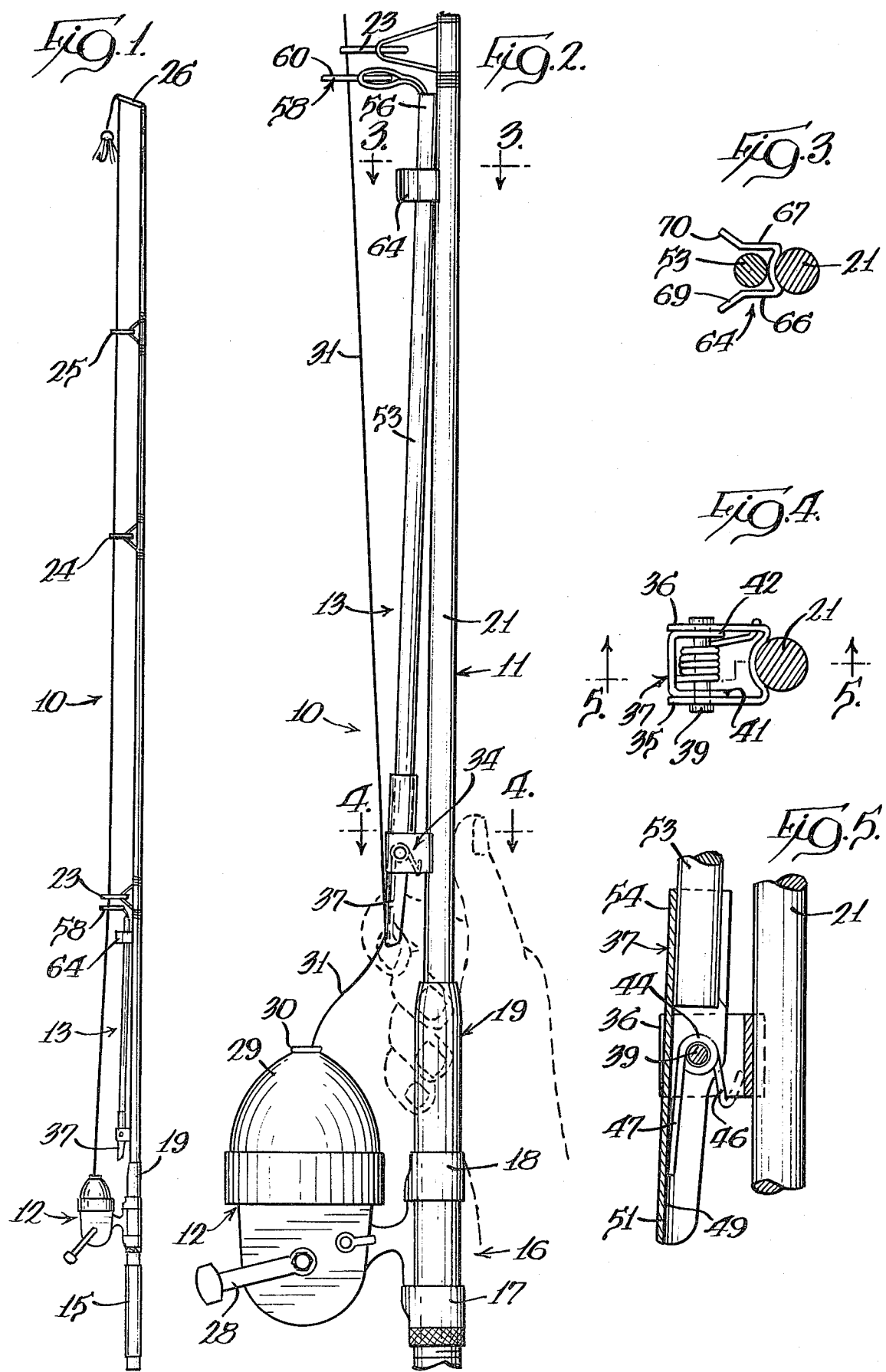

SPIN-CASTING ROD WITH LURE JERKING ASSEMBLY

BACKGROUND OF THE PRESENT INVENTION

Fishing equipment has improved considerably over the last one hundred years beginning with the invention of William Shakespeare in 1896 of the level wind reel with a guide mechanism that traverses back and forth across the spool as the reel is revolve.

The problem with the Shakespeare reel and other prior reels in which casting was effected directly from a reel spool is that a relatively long rod is required and a relatively heavy casting weight is also required to set the reel in motion. Unless very skillfully controlled throughout the casting operation, the reel inertia causes the line speed adjacent the reel to overtake the already payed-out line resulting in line tangling.

In an effort to eliminate or minimize the casting inertia problem caused by initial efforts in the design of casting reels, spinning reels were developed shortly after the turn of the twentieth century which employed fixed spools upon which the line was wound. In these reels the spools remain stationary and the line is wound around the spool by a bail or flyer. This enables the reels to cast very light bait with a somewhat shorter rod than was required in earlier developed reels. In these original spinning reels, the spool is semi-exposed along with the bail assembly so that the line exiting or entering the reel partakes a helical movement. During casting the bail is released from the line and the line slips freely from the stationary spool during casting. After casting the bail is usually reengaged by movement of the reel crank as pay-in or lure retrieval is initiated.

This original spinning-reel was subsequently improved in the advent of the spin-casting reel in which the spool is enclosed by an outer casing having a central hole through which the line extends toward the rod guides. The outer casing eliminates the helical movement of the line forwardly of the reel as in the original spinning reel. Instead of the bail assembly for winding the line on the stationary spool during pay-in, the spin-casting reel is provided with a revolving pick-up cup surrounding the spool rotated by the crank, that has a pick-up pin for grasping the line when pay-in is initiated by crank manipulation.

The spin-casting rod is somewhat shorter than other fishing rods and includes a rear handgrip and a forward handgrip between which is located a straight reel seat. A plurality of guides are provided spaced along the rod including a butt guide near the handgrip, intermediate guides and a "tip top" guide at the distal end of the rod.

When using spinning rods or spin-casting rods, it is common for the sportsman to attempt to improve the attractiveness of the lure, usually a light lure, to the fish by imparting a jerking movement to the rod so that the lure moves forward in rapid spurts in a more lifelike fashion to the animal that the lure stimulates. This lure jerking is particularly desirable in relatively calm waters where the lure is not moved under the influence of water chop.

Even very experienced fishermen have found it difficult to develop any great agility at rod jerking and therefore there have been attempts in the past to provide devices which try to impart intermittent movement to the line and lure, although none have attained a great deal of popularity of the fishermen's market. One attempt to provide the intermittent lure movement is shown in the Wilson U.S. Pat. No. 2,799,112 in which a short pivotal lever is mounted adjacent to the rod handgrip, which bends the entire fishing rod imparting the desired intermittent movement to the main fishing line extending through the tiptop guide. The Wilson device has not achieved any significant degree of success because the jerking line is as long as the length of the entire rod and more importantly because the amount of jerking is minimal with this construction.

Another attempt at effecting lure jerking is shown in the "Line-Jiggling Attachment" patent of Filut, U.S. Pat. No. 2,783,576. Filut provides a mechanical watch type spiral spring ratchet mechanism mounted on the rod opposite the reel that has a relatively short pivot arm with a hole in its weighted end through which line from the reel is threaded before passing through the butt guide on his casting rod. The Filut line-jiggling attachment is not only too complicated, but it projects so far from the rod that it makes rod manipulation very difficult, and furthermore because of the pivot arm position on the rod side opposite the reel, line threaded through the jiggler extends transversely to the axis of the rod which inhibits free line pay-out during casting. Moreover, the Filut jiggling arm is so short that no significant degree of jiggling can be achieved.

A somewhat improved line jiggler is shown in the Mercer U.S. Pat. No. 3,603,018 wherein a thumb actuated lever carries a projection transverse to the rod that selectively extends in the path of line being payed-in from an open faced spinning reel. Since line being payed-in across the bail of an open faced spinning reel partakes a helical motion, the line engages the projection once each revolution of the bail accelerating the line pay-in in intermittent fashion. While the Mercer line jerking assembly is a significant improvement over earlier attempts because of its relative simplicity, it still has some significant disadvantages—one, it is only usable with an open faced spinning reel and cannot be used with a closed faced spin casting reel, and two, the amount of lure and line acceleration is limited and in fact fixed by the radius of the bail assembly since the line once caught on the jerking projection falls off of that projection once the bail is moved 180 degrees, or slightly longer, regardless of the length of the jerking projection.

Other unsuccessful attempts have been made at providing line and lure jerking including the rod oscillating assembly shown in the Ruppa U.S. Pat. No. 3,499,241 and the cumbersome motor and battery driven line jerking device shown in the Yankaitis U.S. Pat. No. 3,789,534.

It is a primary object of the present invention to ameliorate the problems noted above in line and lure jerking assemblies for fishing rod and reel assemblies and particularly for spin-casting rod and reel assemblies.

SUMMARY OF THE PRESENT INVENTION

In accordance with the present invention, a spin-casting rod and reel assembly is provided with an elongated lure jerk rod assembly that extends between the forward rod handgrip and the main rod butt guide, and it provides far greater line jerking length, is easy to manually manipulate and does not project from the rod when it is in its inactive position.

The present jerk rod assembly includes a rod that extends from the handgrip axially parallel to the main rod to a point just short of the butt guide and carries a top guide that is at least as large as and aligned with the butt guide when the jerk rod is in its inactive position so that it does not interfere with normal line casting as in certain other prior line jerking assemblies.

This jerk rod is pivotally mounted to the main rod about an axis transverse to the main rod just forwardly of the forward rod handgrip by a "U" shaped bracket fixed to the main rod, and a pin extending through the bracket carries a torsion spring that biases the jerk rod to its inactive position parallel to the main rod.

A fisherman actuated "U" shaped handle on the jerk rod projects rearwardly from the pivot to the handgrip area so that it may be compressed toward the main rod by the fisherman's index finger while on the forward handgrip. The "U" shaped configuration of the handle permits it to pass somewhat around the main rod as the handle is compressed toward the main rod to increase the swing of the jerk rod as it is actuated. The location of the jerk rod handle adjacent the forward handgrip enables the fisherman to pin the line with his index finger against the handle before casting.

Because the jerk rod is long and its top guide has a wide swinging arc away from the main rod butt guide, it imparts much more life-like jumping movement to the lure and greatly improves fishing expertise and success.

The main rod is provided with a "U" shaped guide adjacent to the butt guide that receives the forward or distal end of the jerk rod when it is in its inactive position to keep it aligned with the main rod during casting and when not in use.

BRIEF DESCRIPTION OF THE DRAWINGS

FIG. 1 is a plan view of a spin casting rod and reel assembly with the present jerk rod assembly shown in its inactive position;

FIG. 2 is an enlarged fragmentary section of the spin casting rod and reel assembly illustrated in FIG. 1 with the fisherman's hand position illustrated on the forward handgrip;

FIG. 3 is a cross/section taken generally along line 3—3 of FIG. 2 illustrating the guide for the forward end of the jerk rod;

FIG. 4 is a cross-section taken generally along line 4—4 of FIG. 2 illustrating the pivotal mount for the jerk rod on the main rod;

FIG. 5 is a longitudinal section of the jerk rod assembly handle taken generally along line 5—5 of FIG. 4.

DETAILED DESCRIPTION OF THE PREFERRED EMBODIMENT

Figure 6:
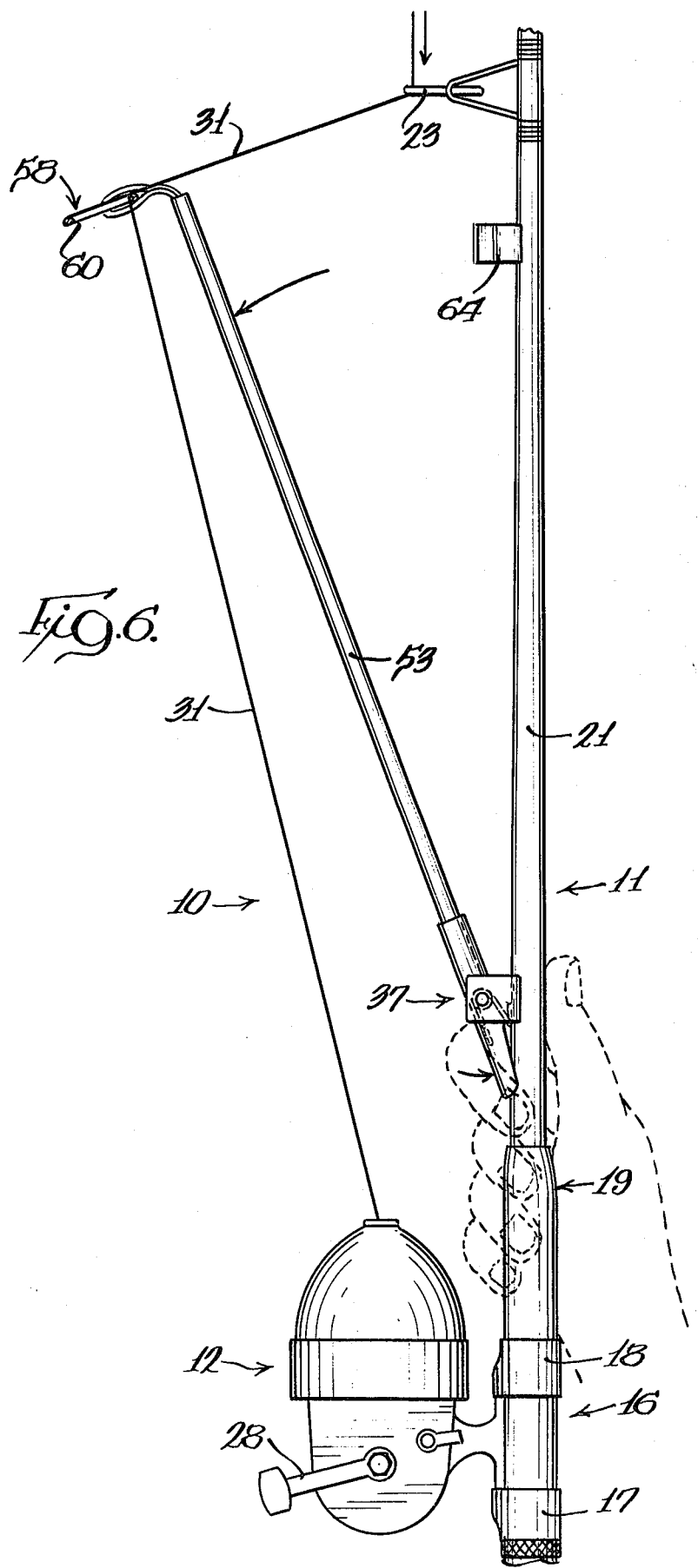
FIG. 6 is a fragmentary view generally similar to FIG. 2 with the jerk rod in its extended position.

Referring to the drawings and particularly FIGS. 2 to 5, a spin-casting rod and reel assembly 10 is illustrated generally including a spin-casting rod 11, a spin-casting reel 12, and a line and lure jerk rod assembly 13. By pivotally moving the jerk rod assembly 13 to the position shown in FIG. 6, the fisherman intermittently accelerates the fishing line with the lure attached during line pay-in.

More specifically, the rod 11 includes a rear grip 15, a reel seat 16 having an adjustable rear ring 17 and a forward ring 18, and a forward handgrip 19 in front of the reel 12. The rod 11 has a conventional tapered forwardly extending main rod portion 21 that is usually constructed of a fiberglass composition. The main rod 21 has a plurality of line guides attached thereto including a rearwardlly positioned butt guide 23 that has an enlarged eyelet, two intermediately spaced guides 24 and 25 with smaller eyelets and a distal guide 26 at the rod end that is commonly referred to as a top guide having a relatively small eyelet through which the line passes.

The reel 12 is a conventional spin-casting reel that has a stationary spool (not shown) around which line is wound by a rotating internal cup assembly that has a line pick up pin that grabs the line during pay-in upon actuation of manual crank 28. Reel 12 is a closed spinning reel and defined as such by a bell shaped housing 29 that surrounds the spool and the pick up cup that has an open ferrule 30 centrally thereof at its forward end through which line 31 passes. As with other pure spinning reels, the spool inside the cup shaped housing 29 has its axis parallel to the axis of rod portion 21 so that during casting line 31 falls freely from the spool away from the pick up cup pin. After free casting, the crank 28 is actuated by the fisherman revolving the internal pick up cup until its pin grasps line 31 and begins winding it onto the stationary spool—all known to those familiar with the details of construction of present day fishing tackle.

The jerk rod assembly 13 includes a "U" shaped metal bracket 34 fixed to the main rod portion just forwardly of the forward handgrip 19 by bonding or by a rivet type fastener (not shown). As seen more clearly in FIG. 4, the bracket 34 has spaced legs 35 and 36 that receive a "U" shaped metal handle 37 for the jerk rod. The jerk rod and handle 37 are pivotally mounted to the main rod 11 by a cleat pin 39 that extends through the legs 35 and 36 of the bracket 34 and through handle legs 41 and 42.

As seen clearly in FIGS. 4 and 5, the jerk rod 13 is biased to its inactive position shown in FIGS. 1 and 2 by a torsion spring 44 that surrounds pin 39 inside the handle 37. Spring 44 has a first leg portion 46 engaging the base of the bracket 34 and a second leg portion 47 engaging the bite portion 49 of handle 37.

The handle 37 has a rearwardly projecting portion 51 that extends to and somewhat over the forward handgrip 19 so that it may be easily manipulated by the fisherman's index finger when on the forward handgrip as shown in FIGS. 2 and 6.

The jerk rod assembly 13 includes a long forwardly extending rod portion 53 preferrably constructed of a fiberglass composition that is bonded at its rear end 54 within the forward end of the "U" shaped handle 37. The rod portion 53 (in its inactive position) extends from the handle forwardly substantially parallel to the main rod to an end 56 closely adjacent the main rod butt guide 23. A top guide 58 is carried at and by the forward end 56 of the jerk rod portion 53 and it has an eyelet 60 through which line 31 passes that is at least as large as the butt guide 23 so that it does not interfere with the line 31 during line pay-out or casting. Top guide eyelet 60 is substantially aligned with the butt guide 23 when the jerk rod 13 is in its inactive position shown in FIGS. 1 and 2.

A "U" shaped guide bracket 64 is provided for holding the forward end of the jerk rod in position aligned with the main rod portion 21 when the jerk rod is in its inactive position. Bracket 64 may be constructed of either metal or plastic and is securely bonded or fastened to the main rod 21 one or two inches rearwardly from the butt guide 23, and it has parallel leg portions 66 and 67 spaced just slightly greater apart than the diameter of the main rod portion 21 at that axial position, and also outwardly extending leg portions 69 and 70 that serve to guide rod portion 21 into the more closely spaced leg portions 66 and 67. The diverging leg portions 69 and 70 align and guide the rod portion 21 into the guide 64 as the jerk rod 53 moves from its active position shown in FIG. 6 to its inactive position shown in FIGS. 1 and 2.

Prior to casting, the fisherman may pin the line 31 conveniently to the handle 37 using his index finger as shown in FIG. 2. After casting line pay-in is initiated by manipulation of crank 28 which engages the reel pick up pin with line 31 to begin lure retrieval. The fisherman then begins successive compressions of the handle 37 with his index finger toward and against the main rod 21 to actuate the jerk rod assembly 13. The legs 41 and 42 of the handle assembly handle 37 are spaced sufficiently far apart so that they may pass somewhat over the sides 21 as shown in FIG. 6 to increase the arc length of movement of the jerk rod 53 and the jerk rods top guide 58 to improve the jerking action and also to stabilize the position of the jerk rod in its outward position. As he successively compresses the handle 37 during line pay-in, the fisherman imparts the desired long jerking movement to the lure producing life-like lure or bait movement. When the fisherman releases his index finger from handle 37 when in the active position in FIG. 6 after each compression, torsion spring 44 pivots the rod 53 clockwise back toward the main rod 21 and forward guide 64 guides the jerk rod to its properly aligned inactive position.

What I claim is:

1. A spin-casting fishing rod and reel assembly for line and lure fishing, comprising; a main rod having a plurality of line guides spaced along its length including a butt guide, a reel seat connected to said rod, a spin-casting reel connected to the reel seat, said rod having a handgrip area between the reel seat and the butt guide, and a manually operable substantially straight jerk rod means for imparting intermittent motion to line payed-out from the reel, said jerk rod means having a top guide at the end thereof positioned between the butt guide on the main rod and handgrip area on the main rod, said jerk rod means being pivotally mounted on the reel side of the main rod about an axis between the top guide and the handgrip area for movement between a first position closely adjacent and parallel to the main rod with the top guide coaxially aligned with main rod butt guide so that the jerk rod means does not interfere with line movement in its first position, and a second position with the top guide spaced substantially from the butt guide to provide the desired intermittent motion to line passing through the top guide on the jerk rod means and the butt guide on the main rod.

2. A spin-casting fishing rod and reel assembly as defined in claim 1, wherein the jerk rod means is pivotally mounted about an axis perpendicular to the axis of the main rod and the jerk rod means, said jerk rod means having a handle extending from the pivotal axis thereof toward the reel, and adjacent the handgrip area so that it may be easily activated by the fisherman's hand while on the handgrip area of the main rod, and spring means urging the jerk rod means to said first position.

3. A spin-cast fishing rod and reel assembly for line and lure fishing as defined in claim 1, wherein the top guide on the jerk rod means is at least as large as the butt guide on the main rod, so that the jerk rod means does not interfere with line pay-out through the butt guide during casting.

4. A spin-casting fishing rod and reel assembly for line and lure fishing as defined in claim 1, wherein the jerk rod means extends axially along the main rod from the handgrip area on the main rod to the butt guide to provide a long arc length as the jerk rod means moves from its first position to its second position.

5. A spin-casting fishing rod and reel assembly for line and lure fishing as defined in claim 1, including a handle on the jerk rod means extending from the pivotal axis thereof toward the reel and adjacent the handgrip area on the main rod, said handle being "U" shaped in cross-section and of sufficient size so that it may fit over the main rod to increase the length of arc of the top guide on the jerk rod means and to also stabilize the postion of the jerk rod means when in its second position.

6. A spin-casting fishing rod and reel assembly for line and lure fishing, comprising; a main rod having a plurality of line guides spaced along its length including a butt guide, a reel seat connected to said rod, a spin-casting reel connected to the reel seat, said rod having a handgrip area between the reel seat and the butt guide, a substantially straight jerk rod means for imparting intermittent motion to line payedout from the reel, said jerk rod means having a top guide at the end thereof positioned between the butt guide on the main rod and the handgrip area on the main rod, said jerk rod means being pivotally mounted on the main rod about an axis between the top guide and the handgrip area for movement between a first position parallel to the main rod with the top guide aligned with main rod butt guide and a second position with the top guide spaced substantially from the butt guide to provide the desired intermittent motion to line passing through the top guide on the jerk rod means and the butt guide on the main rod, and a generally "U" shaped guide on the main rod adjacent to the butt guide for receiving and aligning the top end of the jerk rod means when in its first position parallel to the main rod.

7. A fishing rod reel assembly for line and lure fishing, comprising; a main rod having a plurality of line guides spaced along its length including a butt guide, a reel seat connected to the rod, a line casting reel connected to the reel seat, and a substantially straight jerk rod means for imparting intermittent motion to the line payed-out from the reel, said jerk rod means having a top guide at the end thereof positioned between the butt guide on the main rod and the reel, said jerk rod means being pivotally mounted on the reel side of the main rod about an axis between the top guide and the reel for movement between a first position substantially and closely adjacent and parallel to the main rod with the jerk rod means top guide coaxially aligned with the butt guide so the jerk rod means does not hinder line movement in its first position, and a second position where the top guide is substantially misaligned with respect to the butt guide, said jerk rod means having a handle extending from the pivotal axis thereof toward the reel for manipulation by the fisherman's hand while on the main rod.

8. A fishing rod and reel assembly for line and lure fishing as defined in claim 7, wherein the rod is provided with a handgrip area between the butt guide and the reel.

9. A fishing rod and reel assembly for line and lure fishing as defined in claim 7, wherein the top guide on the jerk rod means is at least as large as the butt guide on the main rod so the jerk rod means does not interfere with the line pay-out through the butt guide during casting.

10. A fishing rod and reel assembly for line and lure fishing as defined in claim 8, wherein the jerk rod means extends axially along the main rod from the handgrip area on the main rod to the butt guide to provide a long arc length as the jerk rod means moves from its first position to its second position.

11. A fishing rod reel assembly for line and lure fishing, comprising; a main rod having a plurality of line guides spaced along its length including a butt guide, a reel seat connected to the rod, a line casting reel connected to the reel seat, a substantially straight jerk rod means for imparting intermittent motion to the line payed-out from the reel, said jerk rod means having a top guide at the end thereof positioned between the butt guide on the main rod and the reel, said jerk rod means being pivotally mounted on the main rod about an axis between the top guide and the reel for movement between a first position substantially parallel to the main rod and a second position where the top guide is substantially misaligned with respect to the butt guide, said jerk rod means having a handle extending from the pivotal axis thereof toward the reel for manipulation by the fisherman's hand while on the main rod, and a generally "U" shaped guide on the main rod adjacent the butt guide for receiving and aligning the top end of the jerk rod means when in its first position parallel to the rod.

12. A spin-casting fishing rod and reel assembly for line and lure fishing comprising; a main rod having a plurality of line guides spaced along its length including a butt guide, a reel seat connected to said rod, a line spin-casting reel connected to the reel seat, said rod having a handgrip area between the reel seat and the butt guide, a substantially straight jerk rod means for imparting intermittent motion to line payed-out from the reel, said jerk rod means having a top guide at the end thereof positioned between the butt guide on the main rod and the handgrip area on the main rod, said jerk rod means being pivotally mounted on the main rod about an axis between the top guide and the handgrip area for movement between a first position parallel to the main rod with the top guide aligned with the main rod butt guide, and a second position with the top guide spaced substantially from the butt guide, a handle on the jerk rod means extending from the pivotal axis thereof toward the reel and adjacent the handgrip area so that it may be easily manipulated by the fisherman's hand on the handgrip area of the main rod, said jerk rod means having a length extending from the handgrip area to a point close to the butt guide on the main rod to provide a long arc length of movement of the jerk rod means top guide when moving from the first position to the second position, spring means urging the jerk rod means toward its first position, and a "U" shaped guide on the main rod adjacent the butt guide for receiving and retaining the jerk rod means in its first position.

* * * * *